(12) United States Patent
Skan

(10) Patent No.: US 10,955,122 B1
(45) Date of Patent: Mar. 23, 2021

(54) FIXTURE INSTALLATION TOOL

(71) Applicant: David N. Skan, Northbrook, IL (US)

(72) Inventor: David N. Skan, Northbrook, IL (US)

( * ) Notice: Subject to any disclaimer, the term of this patent is extended or adjusted under 35 U.S.C. 154(b) by 307 days.

(21) Appl. No.: 15/893,750

(22) Filed: Feb. 12, 2018

Related U.S. Application Data

(60) Provisional application No. 62/457,387, filed on Feb. 10, 2017.

(51) Int. Cl.
  *F21V 21/36* (2006.01)
  *F16M 13/02* (2006.01)
  *F04D 29/64* (2006.01)
  *F04D 25/08* (2006.01)

(52) U.S. Cl.
  CPC ............ *F21V 21/36* (2013.01); *F04D 29/646* (2013.01); *F16M 13/022* (2013.01); *F04D 25/088* (2013.01)

(58) Field of Classification Search
  CPC .......... F21V 21/00; F21V 21/34; F21V 23/00; F21V 21/36; F04D 25/088; F04D 29/646; F16M 13/022
  See application file for complete search history.

(56) References Cited

FOREIGN PATENT DOCUMENTS

| JP | 02-043285 B | * | 9/1990 |
| JP | 3056809 B2 | * | 4/2000 |
| JP | 3554898 B2 | * | 8/2004 |

* cited by examiner

*Primary Examiner* — Carl J Arbes
(74) *Attorney, Agent, or Firm* — Matthew M. Googe; Robinson IP Law, PLLC

(57) ABSTRACT

A fixture installation tool provides for installation of a fixture on a mounting bracket adjacent a surface. The fixture installation tool includes at least one elongate support post removably attached to the mounting bracket and oriented such that the elongate support post extends to a distal end away from the surface, the elongate support post having a diameter such that the elongate support post slidably fits through a mounting hole of the fixture and at least one removable stop located on the distal end of the at least one elongate support post, the removable stop sized to prevent the fixture from sliding off of the at least one elongate support post. The at least one elongate support post is removably attached to the mounting bracket such that the fixture installation tool supports the fixture in proximity to the surface for wiring of the fixture.

13 Claims, 11 Drawing Sheets

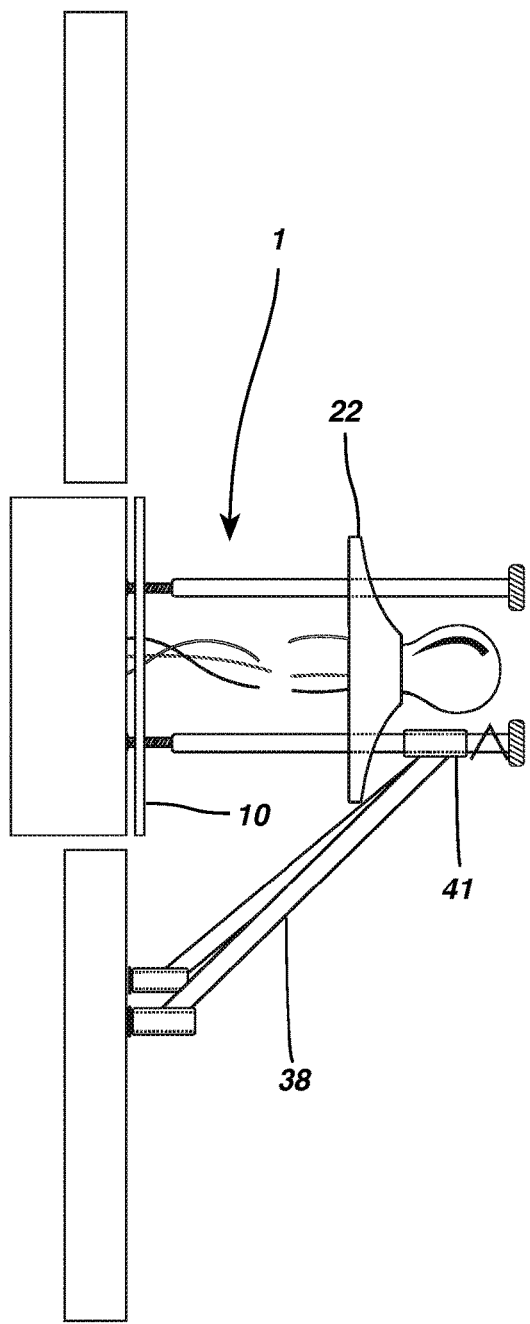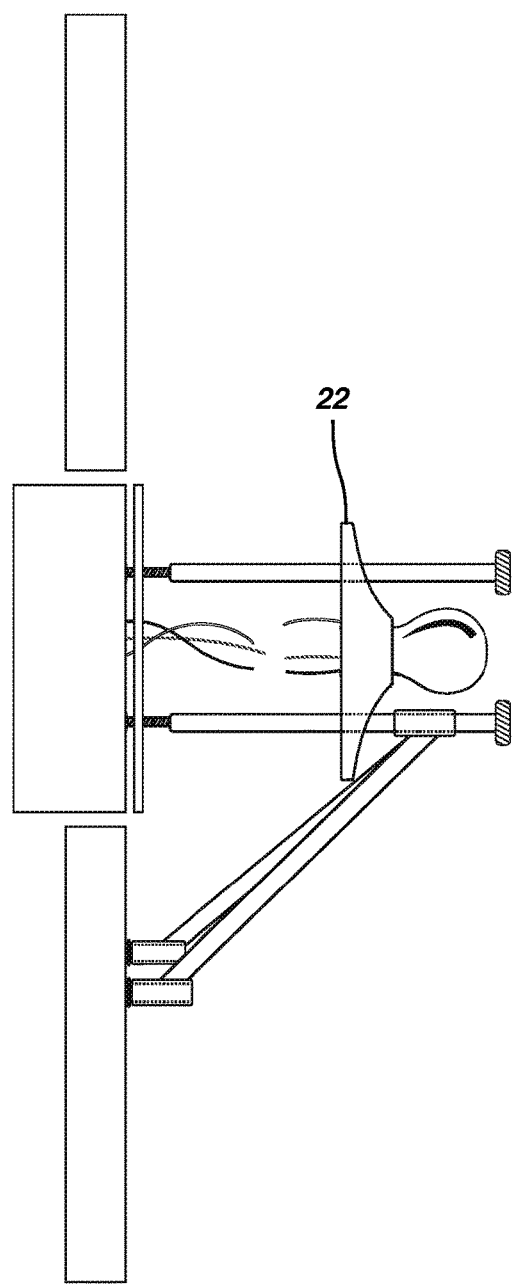
FIG. 12               FIG. 13

FIXTURE INSTALLATION TOOL

CROSS-REFERENCE TO RELATED APPLICATION

This application claims priority to U.S. Provisional Patent Application Ser. No. 62/457,387 to David N. Skan filed on Feb. 10, 2017, for a "Quick and Easy, Flush Mount Light Installation Tool", the contents of which are hereby incorporated by reference in its entirety.

FIELD

This disclosure relates to the installation of fixtures, such as light fixtures. More particularly, this disclosure relates to a fixture installation tool that facilitates the mounting of lights, ceiling fans, or other fixtures to a ceiling or wall surface.

BACKGROUND

Installing fixtures such as lights or ceiling fans can be difficult and often requires more than one user to both install wiring of the fixture and to attach the fixture to a ceiling or wall surface. Traditional methods of installing a fixture require the fixture to be supported while connecting wiring of the fixture to wiring within the ceiling or wall. Fixtures are typically installed at an electrical box installed within the ceiling or wall. A mounting bracket is often attached to the electrical box, and the fixture subsequently affixed to the mounting bracket. Wiring from the electrical box extends through the mounting bracket to be connected to the fixture for powering the fixture.

Because connecting the wiring often requires two hands, a user must often locate assistance for supporting the fixture while the wiring is connected. Even with assistance, it is often difficult to both support the fixture and connect wiring given that often fixtures are installed on a ceiling or high on a wall, thus requiring a ladder for each person assisting with installation of the fixture. A weight of the fixture may further increase difficulty of supporting the fixture while wiring is connected.

What is needed, therefore, is a light fixture installation tool that facilitates the mounting of lights, ceiling fans, or other fixtures to a ceiling or wall surface.

SUMMARY

The above and other needs are met by a fixture installation tool for facilitating installation of a fixture on a mounting bracket adjacent a surface. In a first aspect, a fixture installation tool includes at least one elongate support post removably attached to the mounting bracket and oriented such that the elongate support post extends to a distal end away from the surface, the elongate support post having a diameter such that the elongate support post slidably fits through a mounting hole of the fixture and at least one removable stop located on the distal end of the at least one elongate support post, the removable stop sized to prevent the fixture from sliding off of the at least one elongate support post. The at least one elongate support post is removably attached to the mounting bracket such that the fixture installation tool supports the fixture in proximity to the surface for wiring of the fixture.

In one embodiment, the at least one elongate support post is threadably attached to at least one mounting screw of the mounting bracket. In another embodiment, the at least one elongate support post comprises a pair of parallel elongate support posts.

In yet another embodiment, the fixture installation tool further includes a support leg removably attached to the at least one elongate support post, the support leg extending to a distal end that contacts the surface when the fixture is resting on the at least one elongate support post. In one embodiment, the support leg comprises a pair of diverging support legs forming a bipod. In yet another embodiment, the pair of diverging support legs are joined at a mount, the mount configured to attach the pair of diverging support legs to the at least one elongate support post.

In one embodiment, the at least one elongate support post comprises a single and centrally aligned support post shaped to be removably secured to a center-mount bracket.

In a second aspect, a fixture installation tool includes a pair of elongate support post threadably attached to the mounting bracket and oriented such that the elongate support posts extends to a distal end away from the surface, the elongate support posts having a diameter such that the elongate support posts slidably fit through corresponding mounting holes of the fixture and a pair of removable stops located on distal ends of the at least one elongate support post, the removable stop sized to prevent the fixture from sliding off of the at least one elongate support post. The pair of elongate support post are removably attached to the mounting bracket such that the fixture installation tool supports the fixture in proximity to the surface for wiring of the fixture.

In one embodiment, the fixture installation tool further includes a support leg removably attached to the one of the pair of elongate support posts, the support leg extending to a distal end that contacts the surface when the fixture is resting on the pair of elongate support posts. In another embodiment, the support leg comprises a pair of diverging support legs forming a bipod. In yet another embodiment, the pair of diverging support legs are joined at a mount, the mount configured to attach the pair of diverging support legs to one of the pair of elongate support posts.

In a third aspect, a method of installing a fixture to a mounting bracket includes the steps of: removably attaching at least one elongate support post to a fixture mounting junction; slidably installing the fixture onto the at least one elongate support post such that the fixture is supported on the at least one elongate support post within proximity of a mounting surface; attaching a removable stop to a distal end of the at least one elongate support post to prevent the fixture from being removed from the at least one elongate support post; connecting wires of the fixture to wires from the mounting surface at the mounting bracket; sliding the fixture along a length of the at least one elongate support post until the fixture is adjacent the fixture mounting junction; removing the at least one elongate support post from the fixture mounting junction; and securing the fixture to the fixture mounting junction.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIGS. 12 and 13 show side views of a fixture installation tool according to embodiments of the present disclosure.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

A device for supporting a fixture during installation and wiring of the fixture is described. The device supports the fixture near a ceiling or wall surface such that wires of the fixture may be attached before fully installing the fixture onto the ceiling or wall surface. The device advantageously supports the fixture such that a user may install the fixture without requiring additional assistance during installation.

Figure 1:
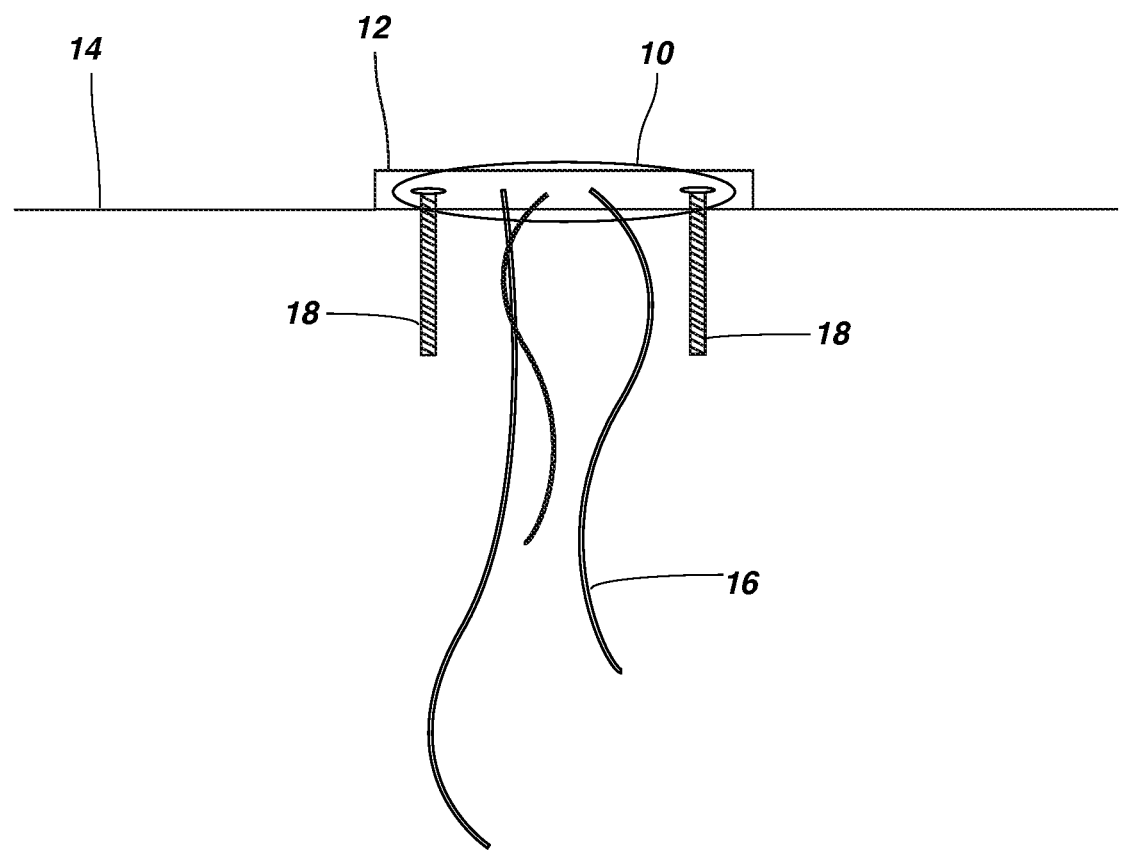
FIG. 1 shows a fixture mounting box and mounting bracket according to one embodiment of the present disclosure.

As shown in FIG. 1, fixtures such as lights, ceiling fans, or other surface-mounted fixtures are installed on a mounting bracket 10 that is attached to a fixture mounting box 12 located within a surface 14, such as a ceiling or wall surface within a structure. A fixture mounting box 12 may be, for example, a junction box or other similar structure. A plurality of wires 16 protruding from the fixture mounting box 12 for powering fixtures mounted on the mounting bracket 10 and connected to the wires 16. With further reference to FIG. 1, a pair of mounting screws 18 are threadably attached to the mounting bracket 10 such that the mounting screws 18 project outward from the surface 14 for securing fixtures to the mounting bracket 10.

While FIG. 1 shows a mounting bracket 10 including a pair of mounting screws 18, it is also understood that embodiments of a fixture installation tool described herein may be suitable for various other types of brackets or fixture installations. For example, embodiments of the present disclosure may be suitable for center-mount type brackets, such as those used for chandeliers or other similar fixtures. Similarly, various other types of brackets may be suitable for embodiments of the present disclosure, including keyhole brackets and other brackets used for supporting fixtures on a ceiling or wall surface.

Figure 2:
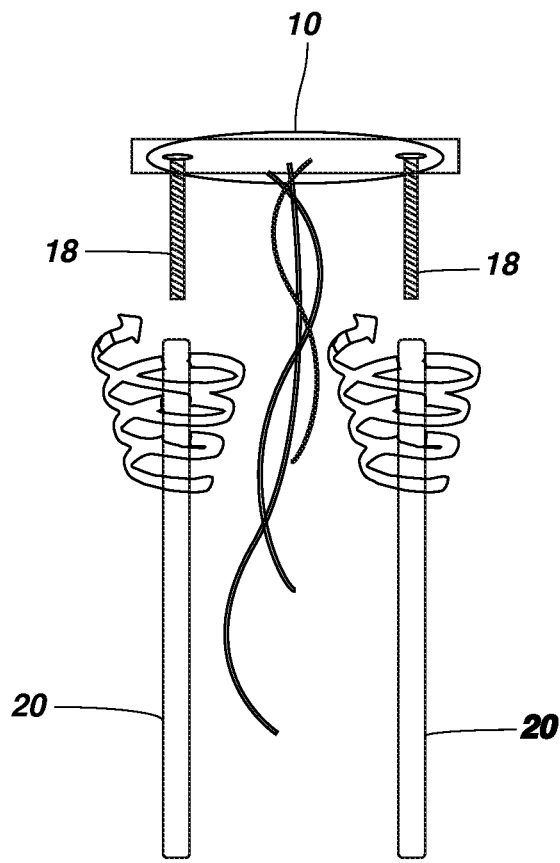
FIG. 2 shows installation of a pair of support posts of a fixture installation tool according to one embodiment of the present disclosure.

Referring now to FIG. 2, a fixture installation tool 1 (FIG. 3) includes a pair of support posts 20 are removably attached to the mounting bracket 10 for supporting a fixture during installation, as described in greater detail below. As shown in FIG. 2, the pair of support posts 20 are preferably threadably attached to the pair of mounting screws 18. The pair of support posts 20 preferably include a smooth outer surface and are elongate, preferably have a length of from about 3 inches to about 9 inches, and more preferably have a length of about 6 inches. The pair of support posts 20 are preferably cylindrical in shape, however it is also understood that various other shapes may be suitable for installing fixtures on the mounting bracket 10 as described in greater detail below. While reference is made to a pair of support posts 20, it is also understood that a single support post 20 may be used to support fixtures during installation.

The pair of support posts 20 are preferably threadably attached to the pair of mounting screws 18 on the mounting bracket 10. The pair of support posts 20 may include threaded ends for engaging the mounting screws 18. Alternatively, the pair of support posts 20 may be otherwise adapted to be removably secured to the mounting bracket 10. For example, threaded end portions of the pair of support posts 20 may be shaped to be inserted into a threaded bore formed through the mounting bracket.

Figure 3:
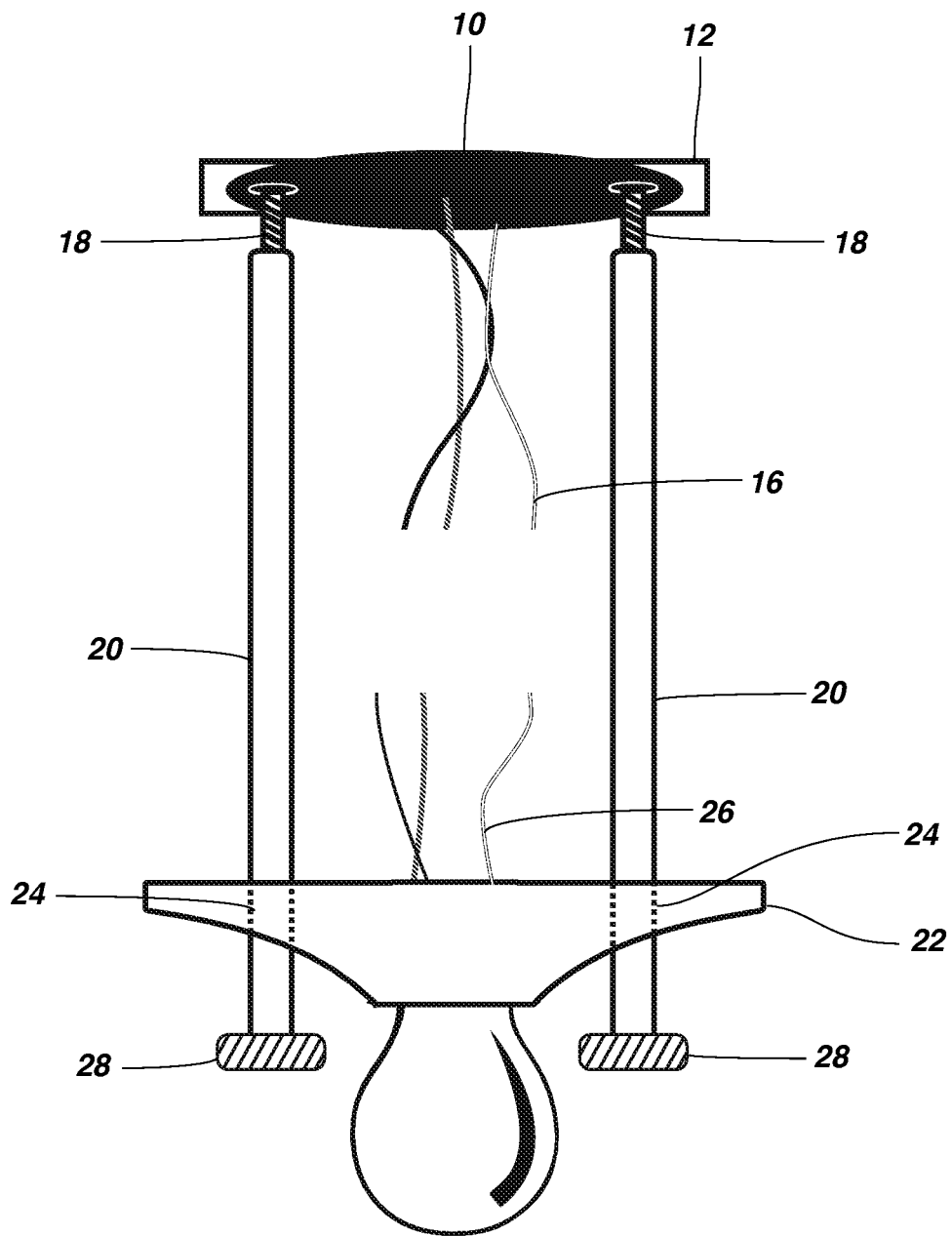
FIG. 3 shows a fixture installation tool supporting a fixture according to one embodiment of the present disclosure.

Referring now to FIG. 3, a fixture 22 is slidably installed on the pair of support posts 20 such that the pair of support posts 20 extend through mounting holes 24 formed through the fixture 22. The fixture 22 preferably includes one or more fixture wires 26 that are in electrical communication with the fixture 22 and configured to be connected to the plurality of wires 16 of the fixture mounting box 12.

After the fixture 22 is slidably installed on the pair of support posts 20, a pair of thumb screws 28 are removably installed on distal ends of the pair of support posts 20 to act as a stop and prevent the fixture 22 from sliding off of the pair of support posts 20. The thumb screws 28 are preferably threadably attached to ends of the pair of support posts 20 and have a diameter that is greater than a diameter of the support posts 20 and mounting holes 24 to prevent the fixture 22 from sliding off of the pair of support posts 20.

Figure 4:
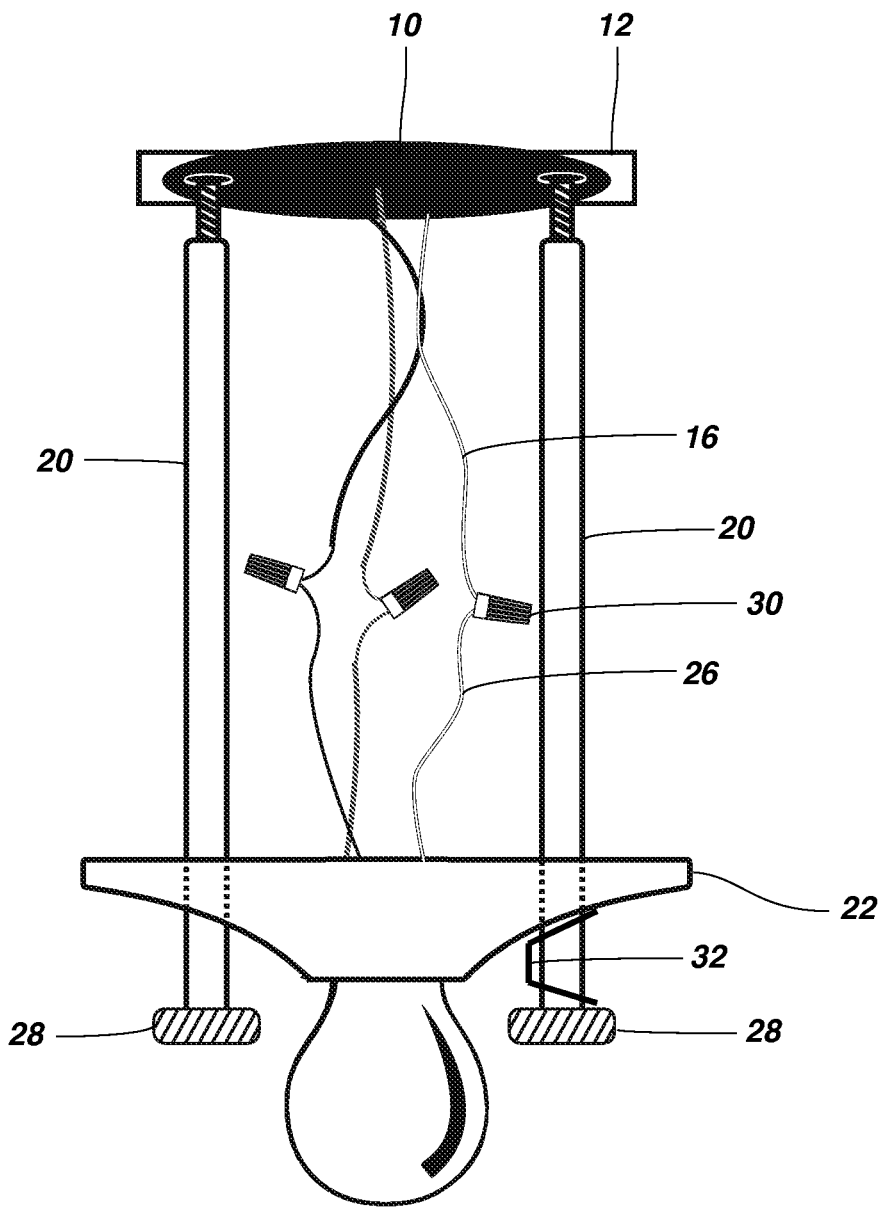
FIG. 4 shows connection of fixture wiring with a fixture installation tool according to one embodiment of the present disclosure.

When the fixture 22 is slidably secured on the pair of support posts 20, the fixture is maintained in proximity to the mounting bracket 10 and plurality of wires 16 associated with the fixture mounting box 12. The fixture 22 is supported near the surface 14 without maintaining the fixture 22 directly against the surface 14, thereby allowing a user to connect the fixture wires 26 to the plurality of wires 16 protruding from the fixture mounting box 12. As shown in FIG. 4, the fixture wires 26 are then connected to the wires 16 associated with the fixture mounting box 12 with a plurality of connectors 30.

While the fixture 22 is preferably supported against the pair of thumb screws 28 removably secured to the pair of support posts 20, it is also understood that a position of the fixture 22 may be adjusted along lengths of the support posts 20 during installation. For example, one or more spring clips 32 may be installed around the pair of support posts 20. The spring clips 32 may be adjustable such that the spring clips 32 may be positioned at various locations along lengths of the support posts 20. The fixture 22 may subsequently rest against the one or more spring clips 32, such as to support the fixture 22 closer to the surface 14 during installation of the fixture 22.

Figure 5:
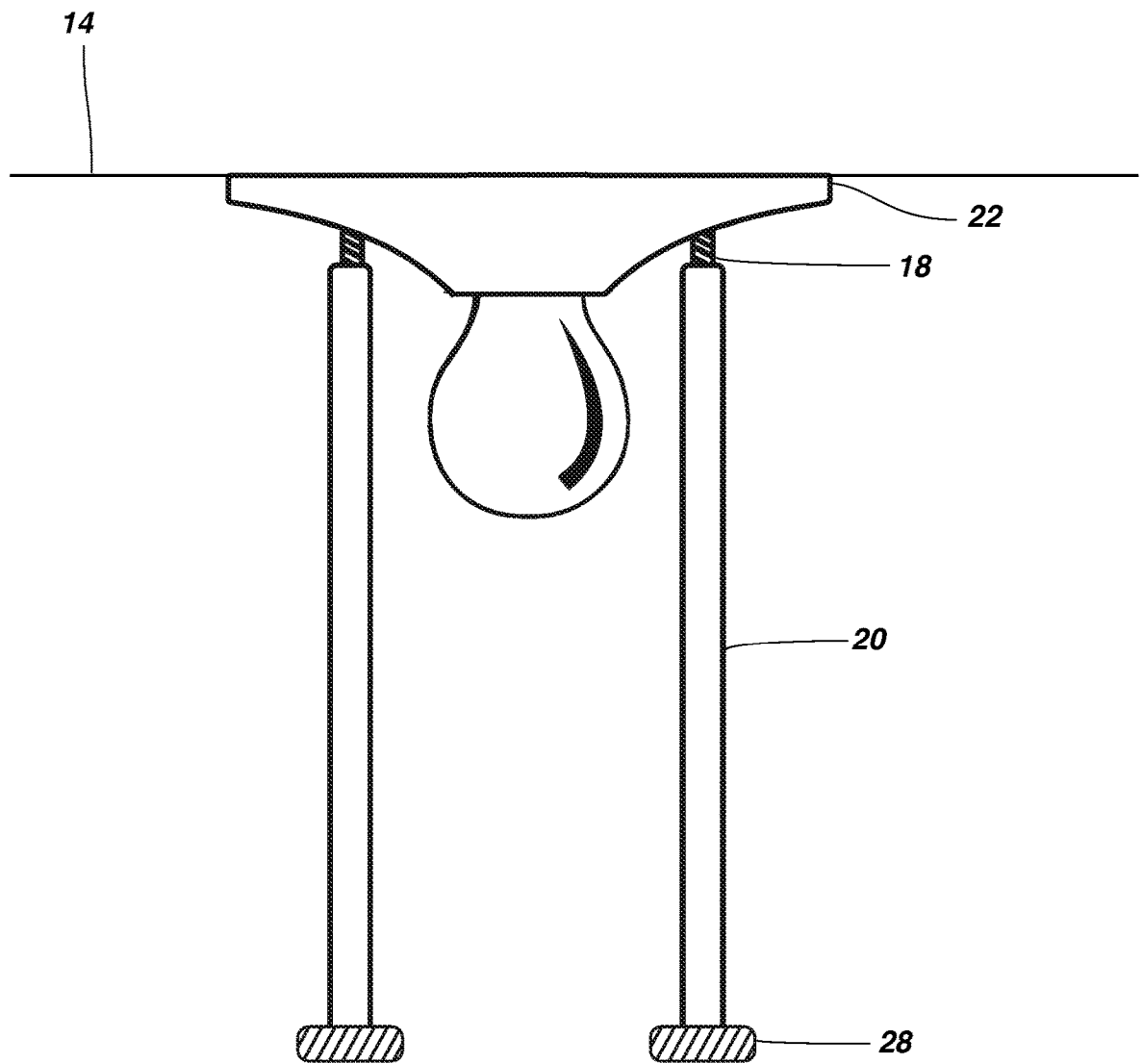
FIG. 5 shows installation of a fixture adjacent a surface according to one embodiment of the present disclosure.

Referring now to FIG. 5, after the fixture wires 26 are connected to the wires 16 of the fixture mounting box 12, the fixture 22 may be slid along the pair of support posts 20 until the fixture 22 is mounted substantially flush with the surface 14. After the fixture 22 is positioned substantially flush with the surface 14, the pair of support posts 20 may be removed from the mounting screws 18. The fixture 22 is then attached to the surface 14, such as by installing a nut or other threaded fastener provided with the fixture 22 over the mounting screws 18.

Figure 6:
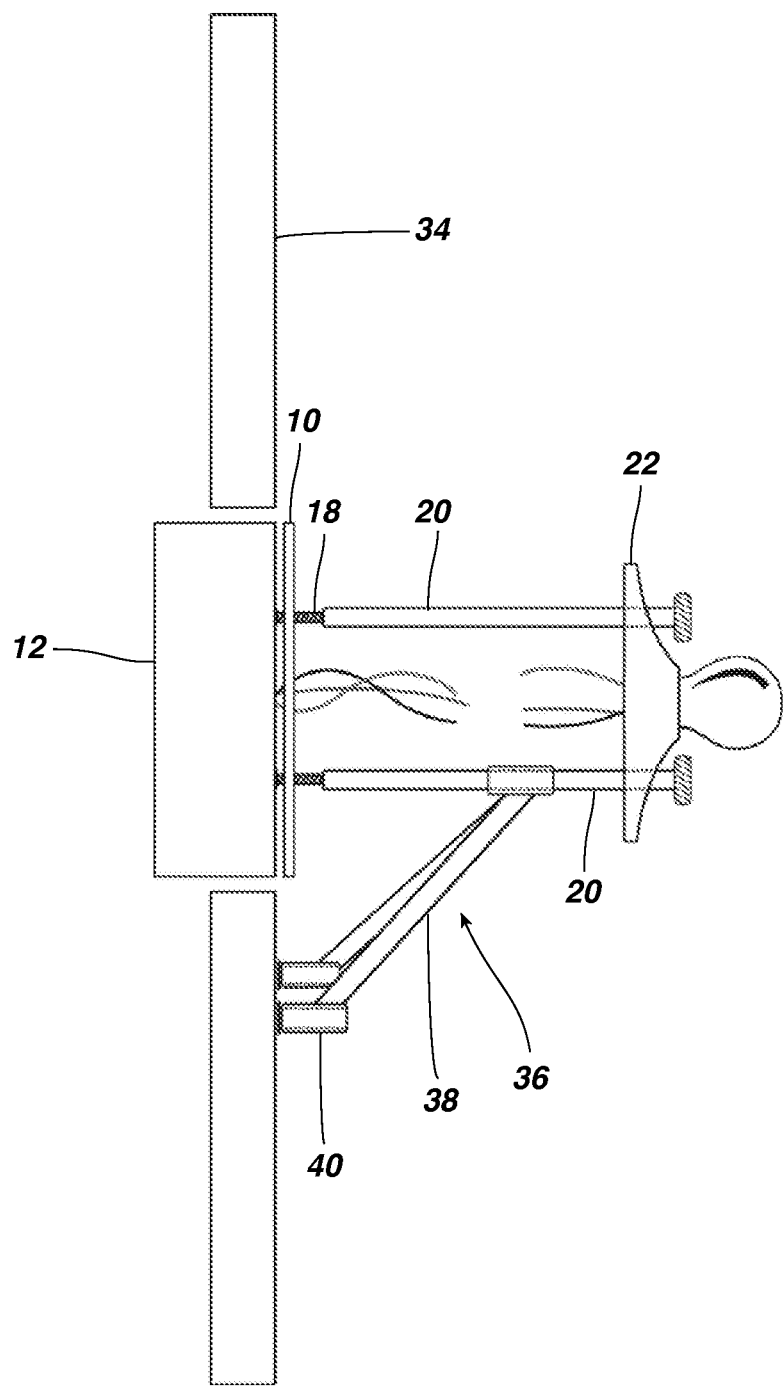
FIG. 6 shows a side view of a fixture installation tool including a support according to one embodiment of the present disclosure.
Figure 7:
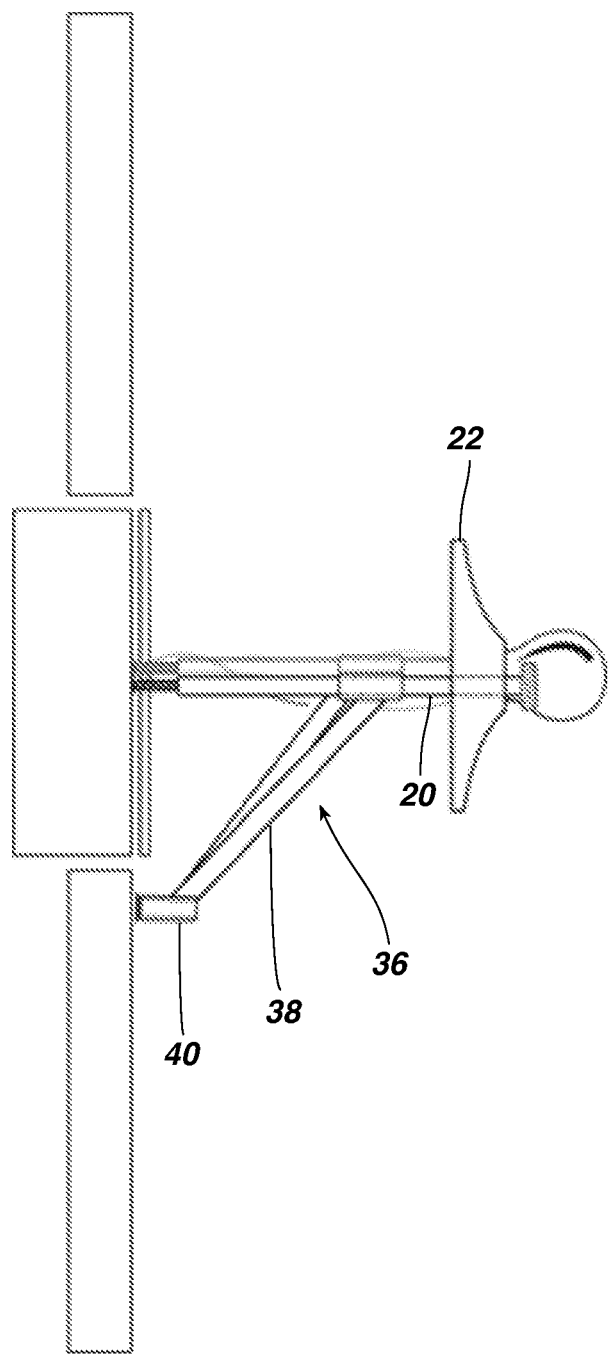
FIG. 7 shows a side view of a fixture installation tool including a support according to one embodiment of the present disclosure.
Figure 8:
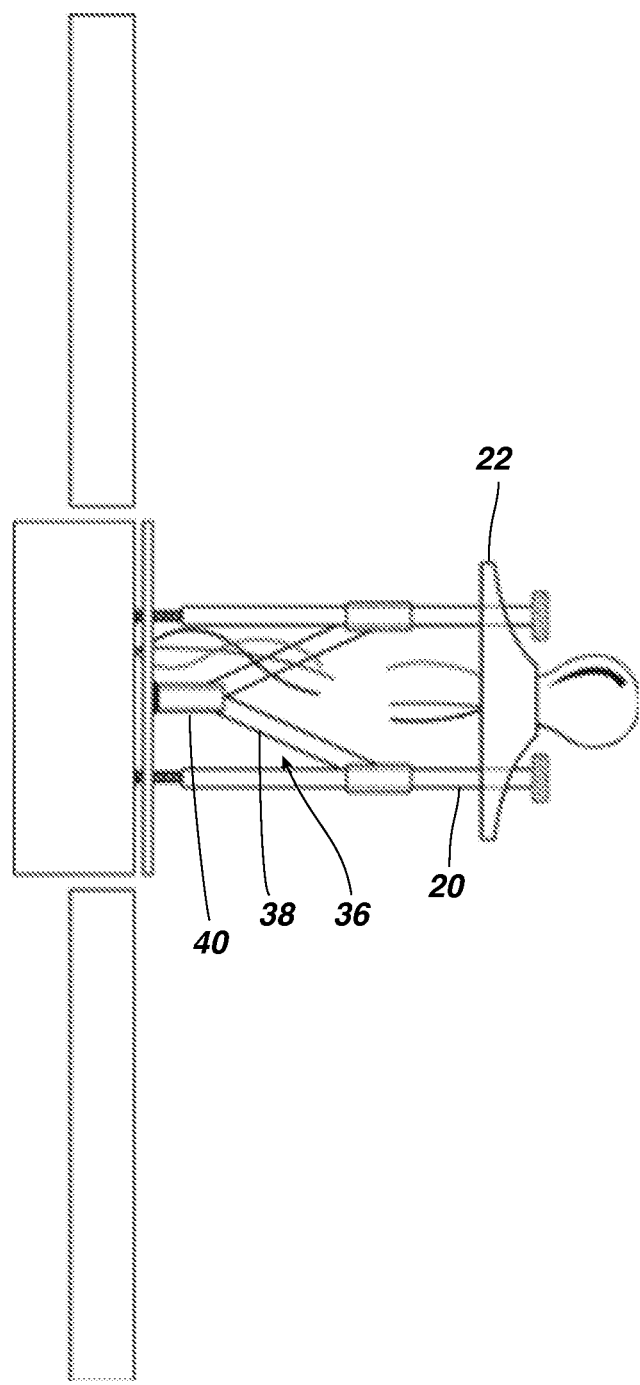
FIG. 8 shows a top view of a fixture installation tool including a support according to one embodiment of the present disclosure.

While FIGS. 2-5 illustrate installation of the fixture 22 on a surface 14 such as a ceiling, embodiments of the present disclosure may also be suitable for installing the fixture 22 on other surfaces such as walls. Referring to FIG. 6-8, the fixture installation tool 1 may be adapted to install the fixture 22 on a wall 34 or other vertical surface. FIG. 6 shows a side view of the fixture installation tool 1 including a support 36 extending from a lower of the pair of support posts 20. The support 36 is configured to provide vertical support of at least one of the pair of support posts 20 during installation of the fixture 22.

As shown in FIG. 6, the support 36 is preferably formed as a bipod and includes a pair of support legs 38 extending from one of the support posts 20 towards the wall 34. The support 36 may be attached to the support posts 20, such as by slidably installing the support 36 around one of the support posts 20. The support 36 includes one or more feet 40 mounted on ends of the support legs 38 for contacting the wall 34. Referring to FIGS. 7 and 8, in one embodiment the support 36 may be attached to both of the support posts 20, such as when the support posts 40 are arranged horizontally. In the embodiment of FIGS. 7 and 8, the support may include a single foot 40 for supporting the pair of support posts 20 during installation of the fixture 22.

As shown in FIGS. 6-8, the support legs 38 may be substantially reversible such that the support legs 38 may support a single of the pair of support posts 20 (FIG. 6) or both of the support posts 20 (FIGS. 7 and 8). The support legs 38 may include mounts formed on ends of the support legs for supporting the support posts 20 with the support legs 38. For example, as shown in FIG. 6, a single mount may be located on an end of the support legs 38 where the support legs 38 are joined. In this configuration, the support legs 38 may support one of the pair of support posts when the mounting screws 18 are oriented substantially vertical relative to each other. Alternatively, when the mounting screws 18 are oriented substantially horizontal, diverged ends of the support legs 38 may be mounted to the support posts 20 with a single joined end of the support legs 38 located adjacent the surface 14.

Referring to FIGS. 12 and 13, a mount 41 of the support legs 38 may be located outside of the fixture 22 such that the fixture 22 may be positioned between the mount 41 and the mounting bracket 10. The spring clip 32 may be located on the support posts 20 adjacent the mount 41 to further support a position of the fixture 22 on the fixture installation tool 1.

Figure 9:
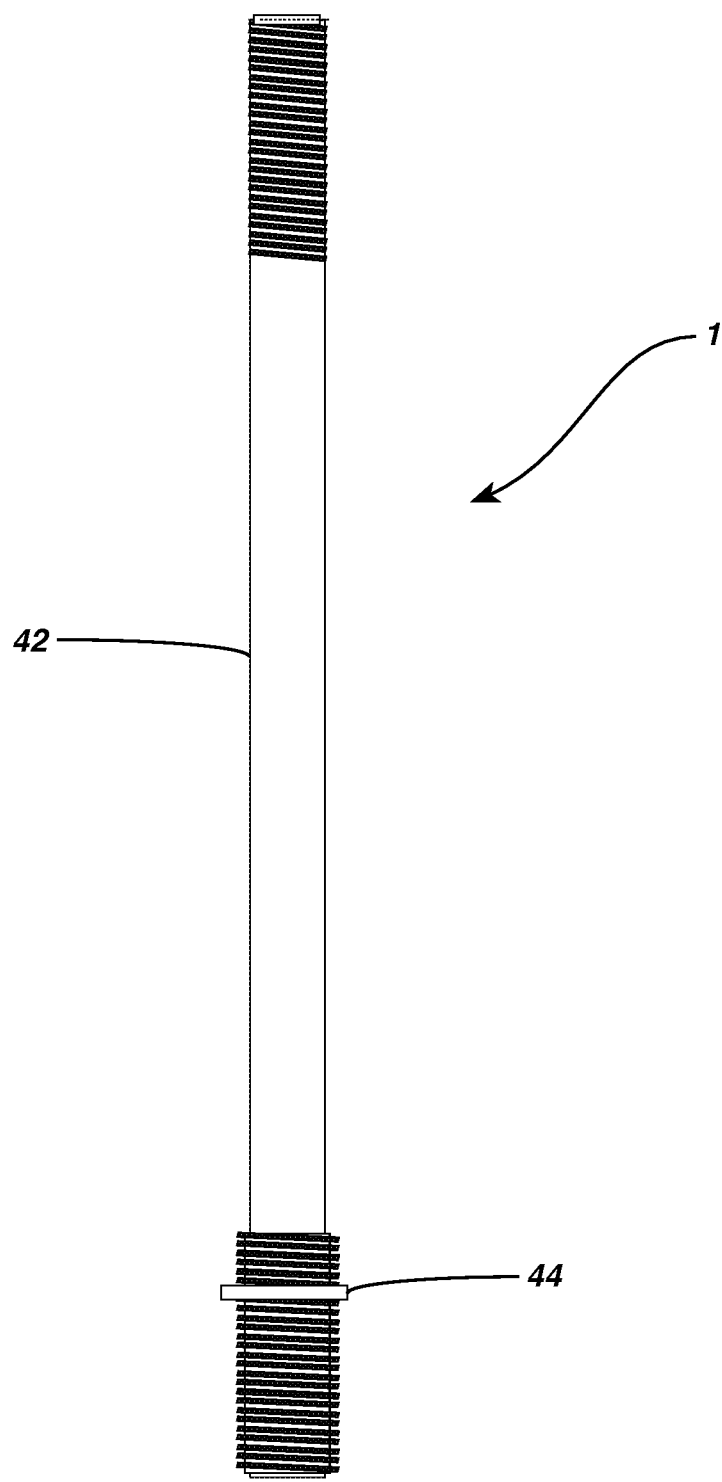
FIG. 9 shows a fixture installation tool adapted for use with a center mount-type fixture according to one embodiment of the present disclosure.

FIG. 9 illustrates an embodiment of a fixture installation tool 1 adapted for installation with a center mount-type fixture. In the embodiment of FIG. 9, the fixture installation tool 1 includes a centrally disposed support post 42 that may be threaded on opposing ends of the support post 42. A lock ring 44 or nut may be threadably engaged with one of the threaded opposing ends for supporting a fixture on the support post 42 during installation. An opposite end of the support post 42 has threads that are preferably shaped to engage an existing threaded portion of a fixture bracket.

Figures 10, 11:
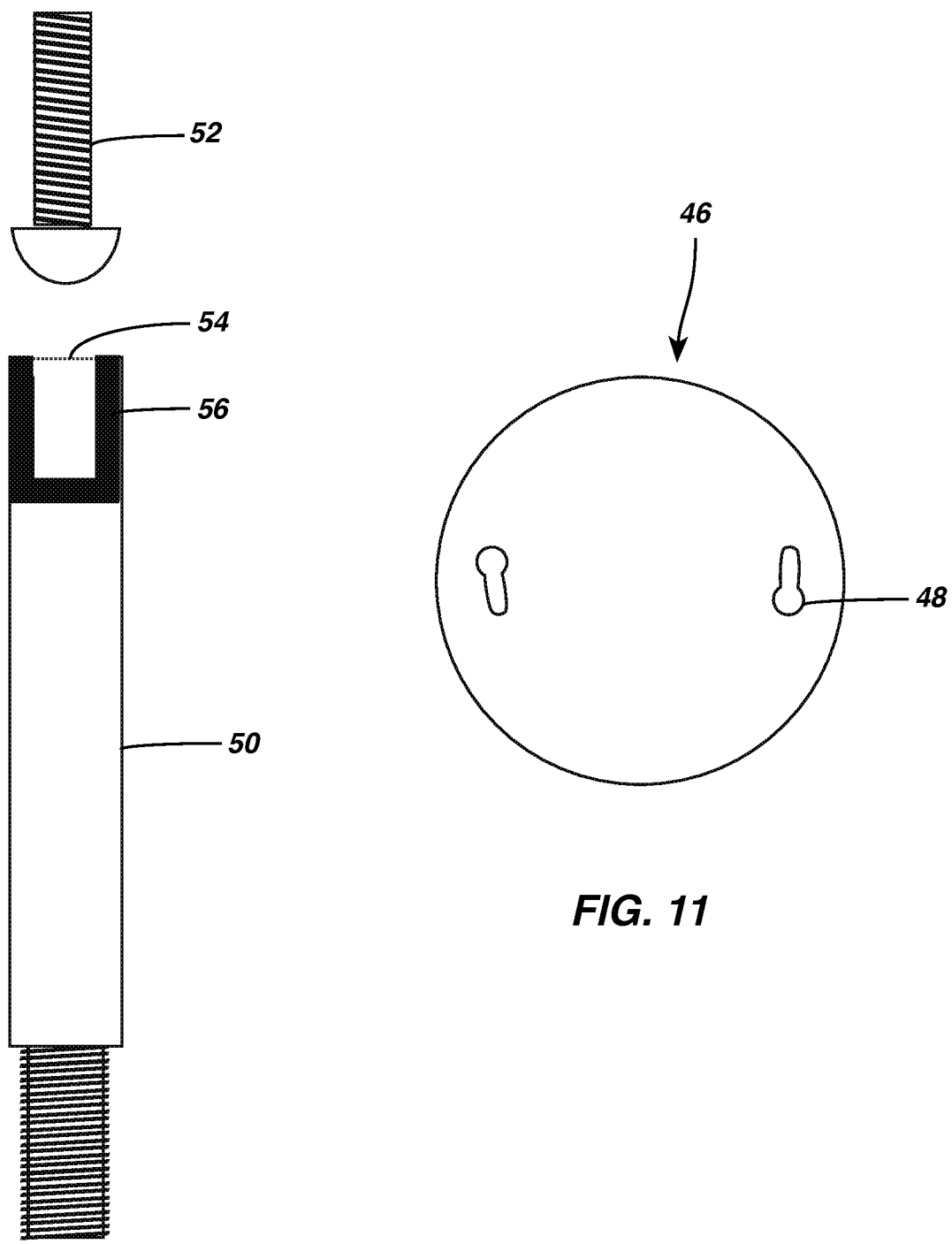
FIGS. 10 and 11 show an adapter for a fixture installation tool for use on a key hole mount-type fixture according to one embodiment of the present disclosure.

FIG. 10 illustrates an embodiment of a fixture installation tool 1 that is adapted for installation for key hole bracket-style fixtures. Key hold bracket-style fixtures are typically mounted on a key hole base 46 (FIG. 11) that includes one or more key holes 48 formed through the key hole base 46. An adapter 50 may be configured to be removably secured to one or more screws 52 that engage the key hole base 46 to secure a fixture to a surface. The adapter 50 may include a hollow open end 54 that is sized to receive a head of the one or more screws 52 into the open end 54 of the adapter 50. A resiliently flexible material 56, such as rubber or a flexible polymer material, is preferably located on an interior of the hollow open end 54 such that the resiliently flexible material 56 captures a head of the one or more screws 52 within the hollow open end 54.

The fixture installation tool 1 of the present disclosure advantageously allows a user to install a fixture, such as a light or ceiling fan, without requiring additional assistance to support the fixture during wiring and installation. The fixture installation tool 1 supports the fixture near a wall or ceiling surface such that the user may connect wires of the fixture to wiring of the structure. After completing wiring of the fixture, the fixture may be subsequently placed adjacent to the wall or ceiling surface for securing the fixture to the surface. The fixture installation tool 1 may further advantageously allow a user to support a fixture at a distance from a surface, such as while the user paints the surface. The user may operate the fixture installation tool 1 to drop or otherwise move the fixture to a distance away from the surface during painting of the surface before re-installing the fixture.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A fixture installation tool for facilitating installation of a fixture on a fixture mounting box on a surface, the fixture installation tool comprising:

at least one elongate support post removably attached to the fixture mounting box and oriented such that the elongate support post extends to a distal end away from the surface, the elongate support post having a diameter such that the elongate support post slidably fits through a mounting hole of the fixture to allow the fixture to slide along a length of the elongate support post during installation of the fixture;

at least one removable stop located on the distal end of the at least one elongate support post, the removable stop sized to prevent the fixture from sliding off of the distal end of the at least one elongate support post during wiring of the fixture with one or more wires at the fixture mounting box;

wherein the at least one elongate support post is removably attached to the fixture mounting box such that the fixture installation tool supports the fixture in proximity to the surface for wiring of the fixture; and wherein during installation of a fixture, the fixture is slidable from a position towards the distal end of the elongate support post during wiring of the fixture to a position such that the fixture is proximate to the fixture mounting box and against the surface.

2. The fixture installation tool of claim 1, wherein the at least one elongate support post is threadably attached to at least one mounting screw of the fixture mounting box.

3. The fixture installation tool of claim 1, wherein the at least one elongate support post comprises a pair of parallel elongate support posts.

4. The fixture installation tool of claim 1, further comprising a support leg removably attached to the at least one elongate support post, the support leg extending to a distal end that contacts the surface when the fixture is resting on the at least one elongate support post.

5. The fixture installation tool of claim 1, wherein the support leg comprises a pair of diverging support legs forming a bipod.

6. The fixture installation tool of claim 5, wherein the pair of diverging support legs are joined at a mount, the mount configured to attach the pair of diverging support legs to the at least one elongate support post.

7. The fixture installation tool of claim 1, wherein the at least one elongate support post comprises a single and centrally aligned support post shaped to be removably secured to a center-mount bracket.

8. The fixture installation tool of claim 1, further comprising an open hollow end attached to the at least one elongate support post for engaging a screw head of a key hole bracket for installation of the fixture on the key hole bracket.

9. The fixture installation tool of claim 8, further comprising a resiliently flexible material located within the open hollow end to entrap the screw head within the open hollow end.

10. A fixture installation tool for facilitating installation of a fixture on a fixture mounting box on a surface, the fixture installation tool comprising:

a pair of elongate support posts threadably attached to the fixture mounting box and oriented such that the elongate support posts extends to distal ends away from the surface, the elongate support posts having diameters such that the elongate support posts slidably fit through corresponding mounting holes of the fixture to allow the fixture to slide along lengths of the pair of elongate support posts during installation of the fixture;

a pair of removable stops located on distal ends of the at least one elongate support post, the removable stop sized to prevent the fixture from sliding off of the distal ends of the at least one elongate support post during wiring of the fixture with one or more wires at the fixture mounting box;

wherein the pair of elongate support post are removably attached to the fixture mounting box such that the fixture installation tool supports the fixture in proximity to the surface for wiring of the fixture.

11. The fixture installation tool of claim 10, further comprising a support leg removably attached to the one of the pair of elongate support posts, the support leg extending to a distal end that contacts the surface when the fixture is resting on the pair of elongate support posts.

12. The fixture installation tool of claim 11, wherein the support leg comprises a pair of diverging support legs forming a bipod.

13. The fixture installation tool of claim 12, wherein the pair of diverging support legs are joined at a mount, the mount configured to attach the pair of diverging support legs to one of the pair of elongate support posts.

* * * * *